US008572348B2

(12) United States Patent
Jing

(10) Patent No.: US 8,572,348 B2
(45) Date of Patent: Oct. 29, 2013

(54) METHOD OF ESTABLISHING HARD DISK PHYSICAL PARTITION

(75) Inventor: Tao Jing, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 1027 days.

(21) Appl. No.: 11/908,266

(22) PCT Filed: Nov. 30, 2005

(86) PCT No.: PCT/CN2005/002061
§ 371 (c)(1),
(2), (4) Date: Sep. 10, 2007

(87) PCT Pub. No.: WO2006/094439
PCT Pub. Date: Sep. 14, 2006

(65) Prior Publication Data
US 2008/0109628 A1 May 8, 2008

(30) Foreign Application Priority Data
Mar. 10, 2005 (CN) .......................... 2005 1 0053728

(51) Int. Cl.
*G06F 12/00* (2006.01)
*G06F 13/00* (2006.01)
*G06F 13/28* (2006.01)

(52) U.S. Cl.
USPC .............. 711/173; 711/102; 711/112; 710/8; 713/2

(58) Field of Classification Search
USPC ............ 711/102, 170, 112, 173; 710/8; 713/2
See application file for complete search history.

(56) References Cited

U.S. PATENT DOCUMENTS

| 5,652,863 | A | * | 7/1997 | Asensio et al. ............... 711/173 |
| 6,385,721 | B1 | * | 5/2002 | Puckette ........................... 713/2 |
| 6,415,383 | B1 | * | 7/2002 | Colegrove et al. ................ 713/2 |
| 7,210,013 | B2 | * | 4/2007 | Itoh et al. ....................... 711/163 |
| 2004/0019739 | A1 | * | 1/2004 | Stevens ........................ 711/112 |
| 2004/0158698 | A1 | * | 8/2004 | Rothman et al. ................... 713/1 |
| 2004/0243759 | A1 | | 12/2004 | Itoh et al. |
| 2005/0050313 | A1 | * | 3/2005 | Chen et al. ........................ 713/2 |
| 2005/0172144 | A1 | * | 8/2005 | Shao ............................. 713/200 |

FOREIGN PATENT DOCUMENTS

| CN | 1210307 A | 3/1999 |
| CN | 1340765 A | 3/2002 |

* cited by examiner

*Primary Examiner* — Stephen Elmore
*Assistant Examiner* — Mark Giardino, Jr.
(74) *Attorney, Agent, or Firm* — Sills, Cummis & Gross P.C.

(57) ABSTRACT

The present invention provides a method of establishing a hard disk physical partition. First of all, it selects a sector in which the head of the hard disk physical partition is located, and establishes a user available partition of the hard disk within the range of the hard disk physical volume from the sector, the other portion of the hard disk becomes a protected partition of the hard disk, finally constitutes one hard disk physical partition. After entering into the hard disk physical partition, only the user available partition can be accessed, the protected partition is invisible to the user. It can establish the different hard disk physical partition in the different position of the hard disk through selecting the sector where the head of the hard disk is located. The present method can realize that protecting the various users' data from each other in physical on the premise of sharing the same hard disk, thus establishes fully separate data storage space from physical level, causes the user to have a proprietary run environment.

11 Claims, 4 Drawing Sheets

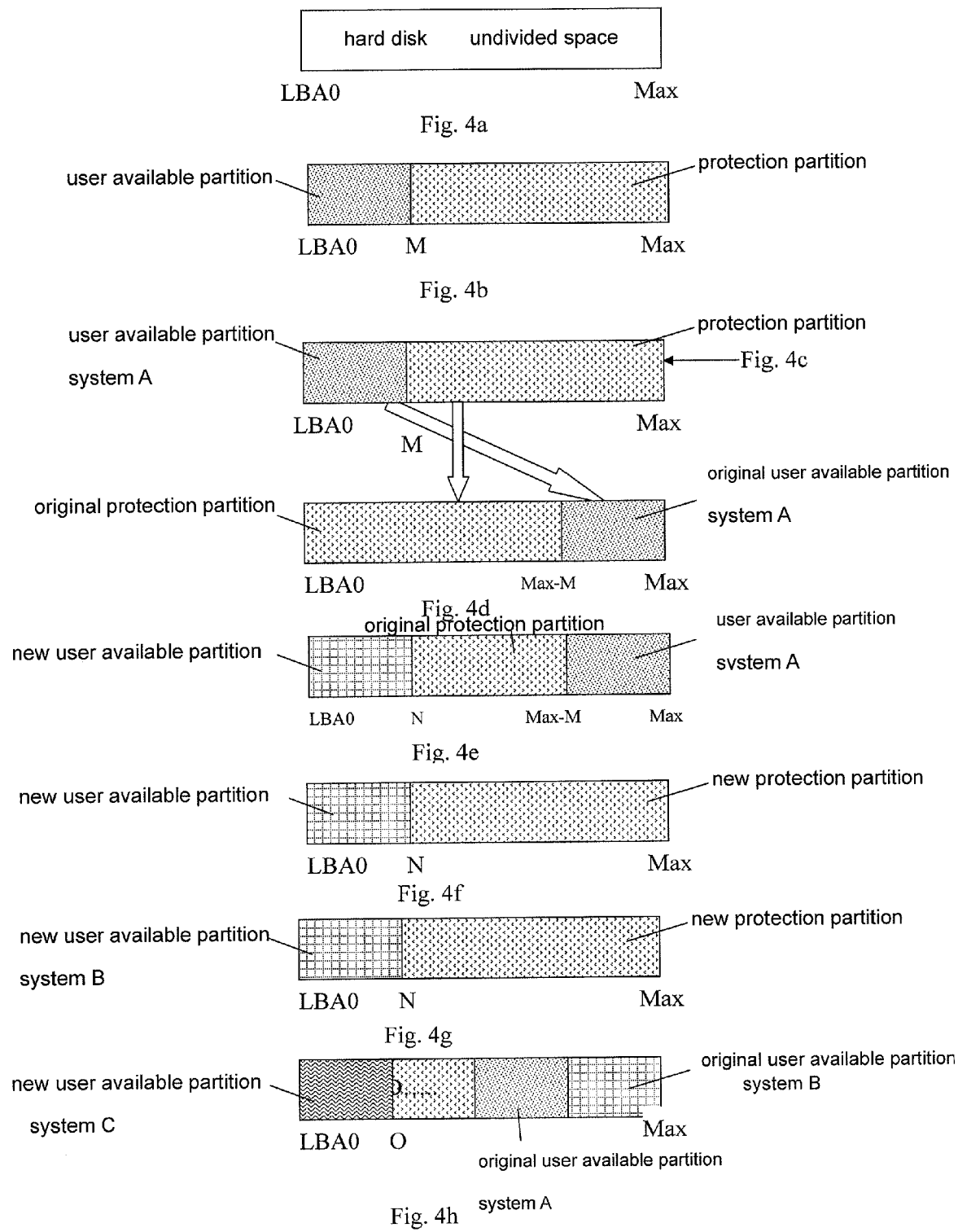

METHOD OF ESTABLISHING HARD DISK PHYSICAL PARTITION

BACKGROUND OF THE INVENTION

1. Field of Invention

The present invention relates to a method of establishing a hard disk physical partition, particularly to a method of establishing a plurality of hard disk physical partitions on a single hard disk.

2. Description of Prior Art

The computer application has penetrated into various fields. Most computers are configured to store data in hard disks. Generally, each computer has one hard disk. However, one and the same computer may serve a plurality of users or different application requirements.

In case of using a single hard disk, individual users generally wish to own a separate running environment. Not only data information for users can be separated, for example, it can not be inter-accessed between the users with each other and have security and privacy etc., but also respectively separate software environment may be established. Sometimes, one and the same user may need to establish different software running environments on the same hard disk for different application requirements.

In prior art, it is possible to set a plurality of user accounts in a single operating system (OS) of a computer. Each account records data information on the computer hard disk for respective users, in order to achieve the separation of different user data. For example, in Windows 2000 and Windows XP, the OS may provide services for a plurality of users, in which each user has his separate account and password and also a corresponding right. The user may encrypt files or file folders with keys generated arbitrarily, by using a multi-user-supported Encrypting File System (EFS). When they have been encrypted, another user can't open them even if he is a system administrator.

In prior art, it is possible to install a plurality of OSs on one and the same computer, in order to serve different application requirements for the users. At this time, various OSs may be installed in different logic partitions and may also be installed in one and the same logic partition. Initiating an OS on the hard disk is mainly achieved by a main booting sector and a system booting sector. The main booting sector is located at the head of the hard disk, i.e. a LBA0 sector, which is responsible for searching for partitions available to be started by the hard disk. The main booting sector is booted by a basic input/output system BIOS and is invoked into a memory for execution. The system booting sector is located at the head of each partition. An SYS command is responsible for booting the OS corresponding to its partition.

In the above prior art, different user data and OSs haven't been separated physically. Thus, it has limitations.

In terms of the approaches in which separate accounts and passwords are provided for users in the above Windows 2000 and Windows XP, firstly it is required to be implemented in a particular OS; secondly, it also needs a specific partition format of NTFS; thirdly, although it can not be opened by the administrator with a high-level right, it may be deleted; when files are copied into a FAT or FAT32 partition, the encryption is missing; and the amount of processing may be increased and the running performance may be reduced by the encryption process.

In the prior art, a plurality of operating systems are installed on one and the same computer. Since various OSs are firstly initialized by a main booting sector program which is started via the hard disk LBA0 sector, if the LBA0 sector is damaged, it will affect a plurality of OSs simultaneously, which is of poor security. Furthermore, the plurality of OSs are visible at the same time in the system, and they would be damaged by other applications or viruses or man-made maloperation, which are also of poor security.

The faults in prior art as described above consist in the fact that the data for different users and OSs cannot be distinguished at the physical level, so that it is unable to provide users with completely separate software running environment.

SUMMARY OF THE INVENTION

As to the defects in prior art as described above, a main object of the present to invention is to provide a method of establishing a hard disk physical partition, which may provide users with a plurality of areas on one and the same hard disk which are physically separated from each other, in order to enable data stored in different areas separate mutually in a physical level.

To solve the technical problem, the present invention provides a method of establishing a hard disk physical partition, comprising the following steps:

1) When a computer start and information about physical partition division is received, wherein the division information comprises of which sector that the head of the hard disk physical partition locate in and the volume of the hard disk physical partition;

2) according to the sector in which the hard disk head of the hard disk physical partition is located in the above received division information, the hard disk head is specified to this sector; and 3) according to the volume of the hard disk physical partition in the above received division information, a hard disk space with the volume, beginning with the sector in which the hard disk head is located is set as a user available partition, and other sectors of the hard disk are set as protection partitions for the hard disk physical partition, wherein the volume of the hard disk physical partition is smaller than the physical volume of the hard disk.

In step 2), the sector in which the hard disk head is located may be a sector which has been determined when the hard disk is shipped out.

The specification of the sector in step 2) may also be implemented by performing an ATA instruction of a command Set FEATURES Enable Address Offset Mode.

In step 3), the setting for the user available partition means that an ATA instruction Set_Max_Address is performed.

After the command Set_Max_Address is performed, a command SET_MAX_SET_PASSWORD may also be performed to set a password for locking the command Set_Max_Address; and next timebefore the command Set_Max_Address is performed, a command SET MAX UNLOCK need be performed with the previously set password in order to unlock the command Set_Max_Address.

The ATA instructions described above are initiated when enter a BIOS environment.

Before step 1), the step of selecting whether to divide a new hard disk physical partition or not may further be comprised; in case of selecting to divide the new hard disk physical partition, step 1) is performed; otherwise, a selection of entering a certain hard disk physical partition is performed.

When the selection of entering the certain hard disk physical partition is performed, a logic partition may be divided from the user available partition, and installing an OS.

The user available partition in the established new hard disk physical partition is located in the previous protection partition of the established hard disk physical partition, in order to avoid the established hard disk physical partition being damaged.

The head of hard disk for the new hard disk physical partition may be located in a start sector for the previous protection partition of the hard disk physical partition, in order to make the maximum use of the volume of the hard disk.

Compared with the prior art, the advantageous effect of the present invention is that the approach of hard disk partition according to the technical scheme of the present invention realizes the separation for hard disk in a physical level by changing the hard disk head on the hard disk, and by setting the user available partition and the user protection partition according to the changed hard disk head. The user available partitions of different hard disk physical partitions are located in different sectors of the hard disk. That is to say, the user available partitions in the various hard disk physical partitions are all located in the protection partitions of other hard disk physical partitions. When an user enters a certain hard disk physical disk, only the user available partition of the hard disk physical partition is visible to the user, while the protection partition of this physical partition is invisible to the user. Thus it is ensured that the user located in a certain hard disk physical partition can not access to other hard disk physical partition, which enables different partitions physically separated from each other.

Based on the above characteristics, it may provide the user with different areas physically separated from each other on the premise of sharing the same hard disk, according to the method of the present invention. Not only the mutual independence of data for various users at the physical level is guaranteed, but the user is provided with a completely proprietary software environment.

Since the method is only needed to be realized by performing several instructions on underlying software without the addition of any hardware, it has the advantages of simple implementation and no additional cost.

BRIEF DESCRIPTION OF THE DRAWINGS

FIGS. 4a to 4h illustrate situations on hard disk partition corresponding to the respective steps in FIG. 3.

DETAILED DESCRIPTION OF PREFERRED EMBODIMENTS

Figure 1:
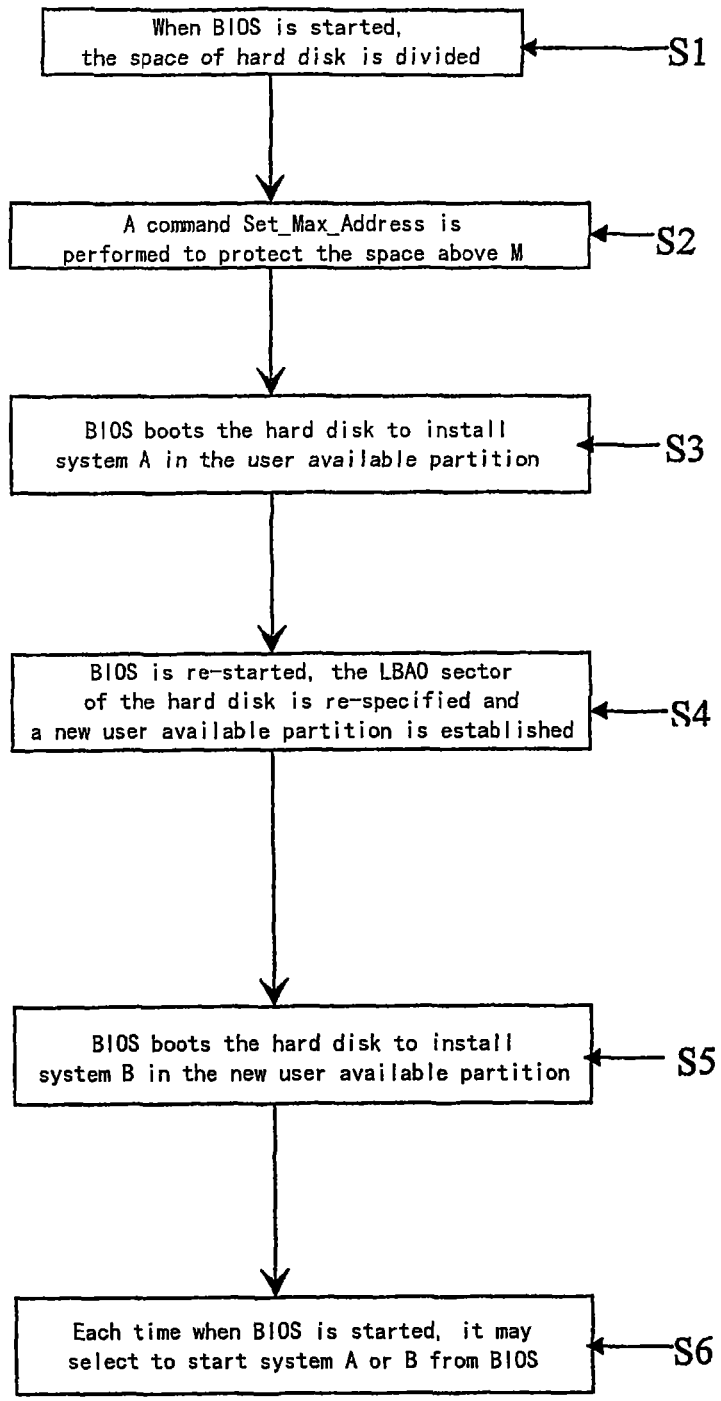
FIG. 1 is a flowchart of a first embodiment of the method according to the present invention.

Hereinafter, the present invention will be further described in detail by referring to the drawings and the embodiments in order to make the objects, technical scheme and advantages of the present invention more apparent.

Referring to FIG. 1, a first embodiment according to the present invention realizes that one hard disk is divided into two physical partitions.

Figure 2A:
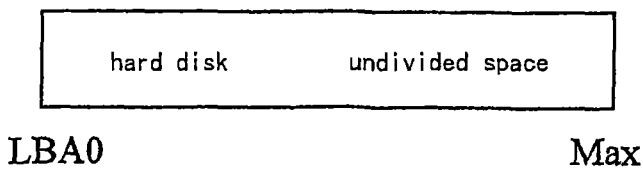
FIGS. 2a to 2e illustrate situations on hard disk partition corresponding to the respective steps in FIG. 1.

In the present embodiment, the division of hard disk physical partition is implemented by a computer program. The program may be a module in BIOS, which is referred as a module for physical partition division and is invoked before BIOS boots an OS on the hard disk. In a case that on the hard disk it neither divides any spaces nor installs any OSs initially (as referred in FIG. 2a), the following operations are performed:

Step S1 in which the computer is powered on and BIOS is started; the module for physical partition division is invoked and it prompts the user to divide the hard disk into a user available partition and a protection partition, and records the selection of the user.

For example, the user available partition is located in the range of an LBA0 sector to an M sector which the user specifies, and the protection partition is located in the range of an M+1 sector to a sector in which a physical maximum address (Native Max Address) of the hard disk is located.

Figure 2B:
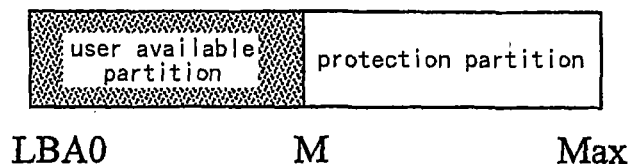

Step S2 in which a command Set_Max_Address is performed in BIOS to protect the protection partition above the M sector for realizing the physical separation. At this time, the protection partition can't be accessed by any software. The state after dividing the hard disk is illustrated in FIG. 2b.

Figure 2C:
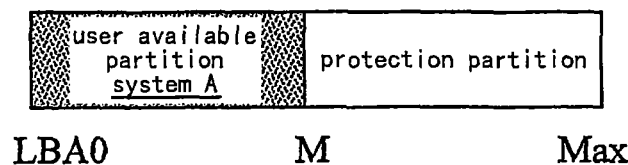

Step S3 in which BIOS continuously boots the hard disk; performs the partition division in a normal manner in the user available partition (LBA0—M sector) which comprises a main partition and a logic partition etc.; and installs the OS. The state of the hard disk is illustrated in FIG. 2c.

Step S4 in which the computer is restarted and BIOS invokes the module for physical partition division; upon the selection of the user, a command Set_FEATURES_Enable_Address_Offset_Mode is performed and re-specifies the position of the LBA0 sector for the hard disk to the start position of the protection partition, a (M+1) sector.

It should be explained that firstly, re-specifying LBA0 to the position of (M+1) sector is in order not to destroy the installed OS A and to make the maximum use of the hard disk resources; the Set_FEATURES_Enable_Address_Offset_Mode command can specify the LBA0 to any section on the hardware; secondly, performing the instruction on re-specifying the LBA0 sector would not destroy any existing data information on the hardware.

Figure 2D:
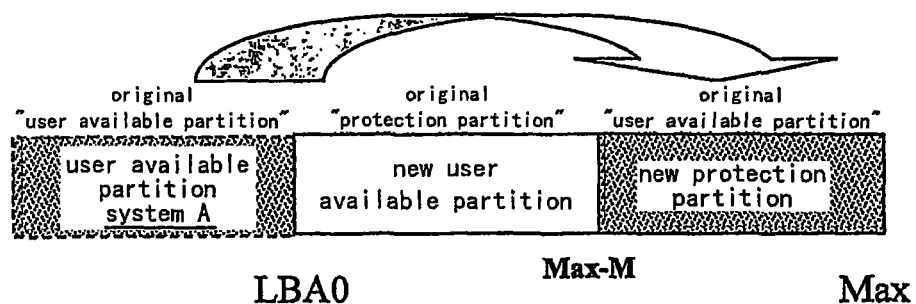

The command Set_Max_Address is re-preformed to protect a sector above the sector for a new address Max-M+1 and protect a new protection partition, i.e. the original user available partition. When completing the command, the state of the hard disk is illustrated in FIG. 2d.

Figure 2E:
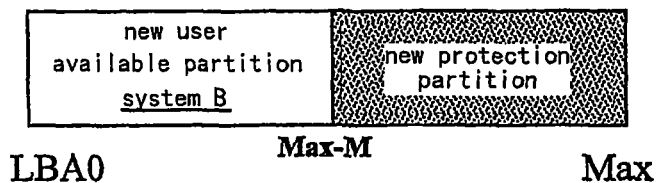

Step S5 in which BIOS continuously boots the hard disk; performs the partition division in a normal manner for the new user available partition (new address LAB0 to the Max-M sector), which comprises a main partition and a logic partition etc.; and installs the OS B. When the installation is completed, the state of the hard disk is illustrated in FIG. 2e.

Step S6 in which each time when the BIOS is started, OS A or B may be selected to be started in BIOS.

If the OS A is selected, the LBA0 is guaranteed to be set at the LBA0 start position of the original hard disk by the module in BIOS, the corresponding protection partition is protected, and the corresponding OS A is started from LBA0.

If the OS B is selected, the command Set_FEATURES_Enable_Address_Offset_Mode is performed by the module for physical partition division in BIOS, in order to guarantee that the LBA0 is set at the (M+1) of the original hard disk; the command Set_Max_Address is preformed in BIOS and the corresponding protection partition is protected, and the corresponding OS B is started from a new LBA0 position.

As described above, each time when the command Set_Max_Address is used, the command SET_MAX_SET_PASSWORD is immediately used to set a password protection in 32-byte for locking the command Set_Max_Address. The purpose is to prevent other programs from entering BIOS and from changing the setting for the user available partition and the protection partition of the physical hard disk, so as to ensure that the established physical hard disk can not be damaged illegally. Hereinafter, each time before the command Set_Max_Address is used, a command SET_MAX_UNLOCK must be performed in connection with the previously set to 32-byte password in order to unlock the command Set_Max_Address.

Figure 3:
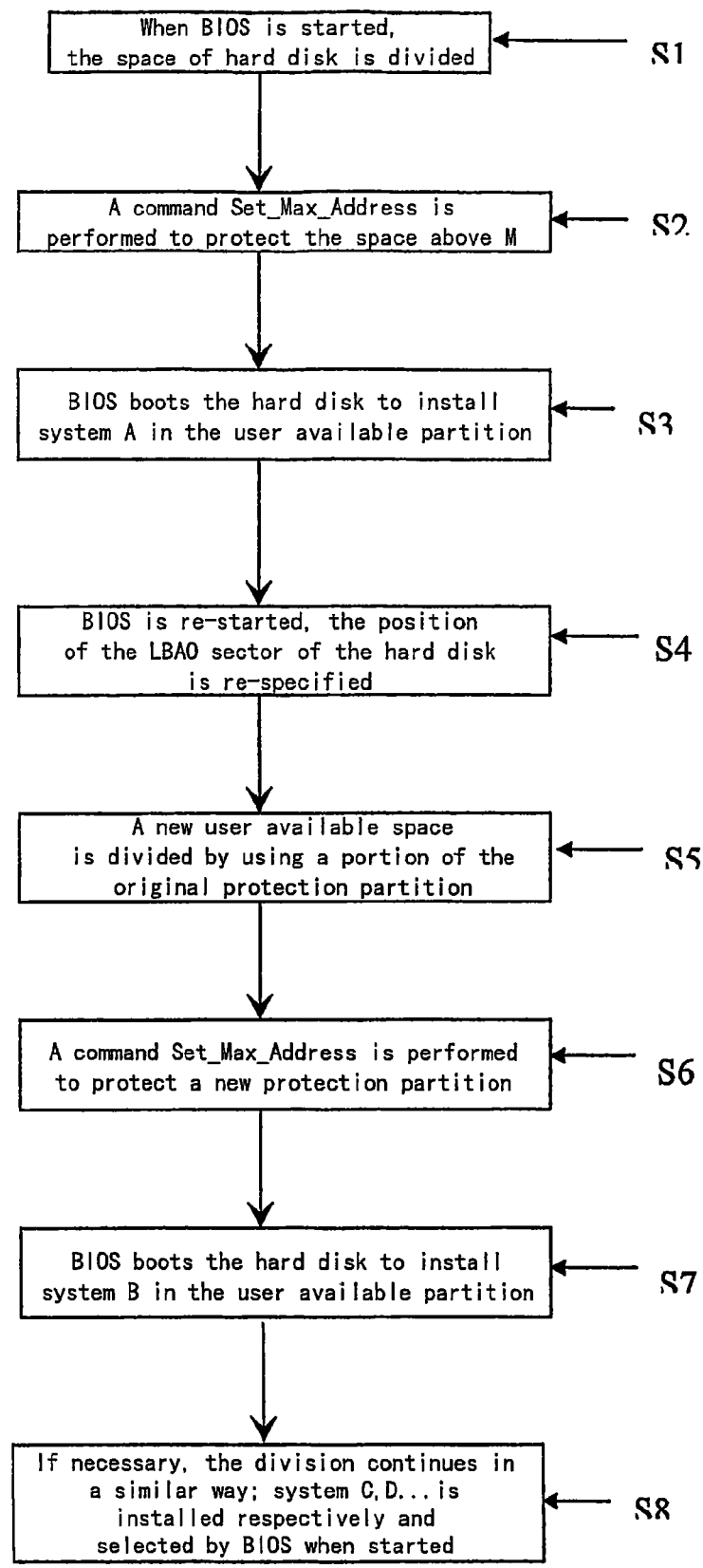
FIG. 3 is a flowchart of a second embodiment of the method according to the present invention.

Referring to FIG. 3, a flowchart of a second embodiment according to the present invention is illustrated. It may obtain a plurality of OSs independent from each other and physically separated on one and the same hard disck, so as to install Windows 98, Windows 2000, Windows XP, Linux, Novell, Unix etc simultaneously.

Physical separation is realized, and the module for physical partition division for LBA0 sector position may be set to locate in BIOS and may be invoked before BIOS boots the OS on the hard disk. As illustrated in FIG. 4a, the hard disk initially neither divides any space nor installs any OSs.

The actual operation steps are as follows:

Step S1 in which the computer is powered on, and a module for BIOS invoking is started to prompt the user to divide a user available partition and a protection partition.

For example, the user available partition is located in the range of an LBA0 sector to an M sector which the user specifies, and the protection partition is located in the range of an M+1 sector to a sector in which an actually physically maximum address (Native Max Address) of the hard disk is positioned.

Step S2 in which a command Set_Max_Address is performed in BIOS to protect the protection partition above the M sector for realizing the physical separation. At this time, the protection partition can't be accessed by any software. After the execution, the state of the hard disk is illustrated in FIG. 4b.

Step S3 in which BIOS continuously boots the hard disk; performs the partition to division in a normal manner for the user available partition (LBA0—M sector) which comprises a main partition and a logic partition etc.; and installs the OS A (eg. Windows98). The state of the hard disk after installation is illustrated in FIG. 4c.

Step S4 in which the computer is restarted and BIOS invokes the module; upon the selection of the user, a command Set_FEATURES_Enable_Address_Offset_Mode is performed and re-specifies the position of the LBA0 sector for the hard disk to the start position of the protection partition, that is, a (M+1) section. When the process is completed, the state of the hard disk is illustrated in FIG. 4d.

It should be explained that firstly, re-specifying LBA0 to the position of (M+1) sector is in order not to destroy the installed OS A and to make the maximum use of the hard disk resources which may theoretically be specified to any positions larger than the (M+1) sector; secondly, performing the instruction on re-specifying the LBA0 sector would not destroy any existing data information on the hard disk.

Step S5 in which a new user available partition (LBA0-N sector) is divided at the start position of the original protection partition (a new LBA0 sector). After the execution, the state of the hard disk is illustrated in FIG. 4e.

A new user available partition N is smaller than the original protection partition.

Step S6 in which the command Set_Max_Address is re-preformed to protect a sector above the sector for a new address N+1 and to protect a new protection partition, i.e. the original user available partition and a portion of the original protection partition. When completing the command, the state of the hard disk is illustrated in FIG. 4f.

Step S7 in which BIOS continuously boots the hard disk; performs the partition division in a normal manner for the new user available partition (new address LABO to the N sector) which comprises a main partition and a logic partition etc.; and installs the OS B. When it is completed, the state of the hard disk is illustrated in FIG. 4g.

Step S8 in which step 4 to step 7 are repeated and the original protection partition may be continuously divided and OSs C, D, E . . . are installed respectively, as illustrated in FIG. 4h.

Each time when the BIOS is started, system A, B, C or D . . . may be selected for initiation in BIOS.

If the OS A is selected, the LBA0 is guaranteed to be set at the LBA0 start position of the original hard disk by the module in BIOS; the corresponding protection partition is protected, and the corresponding OS A is started from LBA0.

If the OS B is selected, the LBA0 is guaranteed to be set at (M+1) of the original hard disk by the module in BIOS, the corresponding protection partition is protected, and the corresponding OS B is started from a new LBA0 position . . . and so on. In case that the LBA0 is guaranteed to be set to a correct position and that the corresponding protection partition is protected, any of OSs may be started.

The above is only the preferred embodiments of the present invention and the present invention is not limited to the above embodiments. Therefore, any modifications, substitutions and improvements to the present invention are possible without departing from the spirit and scope of the present invention.

The invention claimed is:

1. A method of establishing a hard disk physical partition, the method being applied to a computing device including a hard disk, wherein the hard disk includes an original user available partition located in a range from '0' sector to an M sector which a user specifies, and a protection partition located in a range from an (M+1) sector to a sector in which a physical maximum address of the hard disk is located, the method comprising the following steps:

1) starting a computer, selecting whether to divide a new hard disk physical partition or not, and receiving information on a hard disk physical partition division in case of selecting to divide the new hard disk physical partition, wherein the information on the hard disk physical division comprises a sector in which a hard disk head portion for the new hard disk physical partition is located and a volume of the new hard disk physical partition;

2) locating the hard disk head portion to the (M+1) sector, according to the sector in which the hard disk head portion for the new hard disk physical partition in the received information on the hard disk physical partition division; and 3) setting a hard disk space with the volume beginning with the (M+1) sector, as a new user available partition independent of or separated from the original user available partition according to the received information on the hard disk physical partition division, and setting other sectors of the hard disk that include the original user available partition as a new protection partition of the hard disk, wherein the volume of the new hard disk physical partition is smaller than a physical volume of the hard disk.

2. The method according to the claim 1, wherein the locating of the sector in step 2) comprises performing an ATA (Advanced Technology Attachment) instruction of a command Set_FEATURES_Enable_Address_Offset_Mode.

3. The method according to claim 2, wherein the ATA (Advanced Technology Attachment) instructions enter a BIOS (Basic Input/Output system) environment to be performed when they are initiated.

4. The method according to the claim 1, wherein the setting for the user available partition in step 3) comprises performing an ATA (Advanced Technology Attachment) instruction Set_Max_Address.

5. The method according to the claim 4, wherein the ATA (Advanced Technology Attachment) instructions enter a BIOS (Basic Input/Output system) environment to be performed when they are initiated.

6. The method according to the claim 1, wherein after a command Set_Max_Address is performed, a command SET_MAX_SET_PASSWORD is also performed to set a password for locking the command Set_Max_Address; and before the command Set_Max_Address is performed, a command SET_MAX_UNLOCK is performed in connection with the previously set password in order to unlock the command Set_Max_Address.

7. The method according to the claim 6, wherein the ATA (Advanced Technology Attachment) instructions enter a BIOS (Basic Input/Output system) environment to be performed when they are initiated.

8. The method according to the claim 1, wherein in case of not selecting to divide the new hard disk physical partition, selecting to enter a certain hard disk physical partition is performed.

9. The method according to the claim 8, wherein when the selecting to enter the certain hard disk physical partition is performed, the method further comprises dividing a logic partition from the user available partition and then installing an OS (Operating System).

10. The method according to the claim 8, wherein the user available partition for the new hard disk physical partition is located in the protection partition of a previously established hard disk physical partition.

11. The method according to the claim 8, wherein the hard disk head portion for the new hard disk physical partition is located in a start sector for the protection partition of a previously established hard disk physical partition.

* * * * *